United States Patent
Wunderlich et al.

(10) Patent No.: US 6,569,940 B1
(45) Date of Patent: May 27, 2003

(54) USE OF 2,2,6,6 TETRAALKYLPIPERIDINE-N-OXYL RADICALS HAVING LONG ALKYL CHAINS AS POLYMERIZATION REGULATORS

(75) Inventors: Wiebke Wunderlich, Bickenbach (DE); Margot Clauss, Riedisheim (FR); Michael Roth, Lautertal (DE); Francesco Fuso, Therwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/720,440
(22) PCT Filed: Jun. 15, 1999
(86) PCT No.: PCT/EP99/04119
§ 371 (c)(1), (2), (4) Date: Dec. 22, 2000
(87) PCT Pub. No.: WO99/67298
PCT Pub. Date: Dec. 29, 1999

(30) Foreign Application Priority Data

Jun. 25, 1998 (EP) ............................................. 98810585

(51) Int. Cl.$^7$ ........................ C07D 251/06; C08F 2/02; C08F 2/14; C08F 2/16; C08K 5/3492
(52) U.S. Cl. ........................................ 524/718; 526/204
(58) Field of Search ........................... 524/718; 526/204

(56) References Cited

U.S. PATENT DOCUMENTS

| | | | | |
|---|---|---|---|---|
| 4,314,933 A | * | 2/1982 | Berner ........................ | 524/718 |
| 4,581,429 A | | 4/1986 | Solomon et al. ............ | 526/220 |
| 5,204,473 A | | 4/1993 | Winter et al. ............... | 546/188 |
| 5,412,047 A | | 5/1995 | Georges et al. ............. | 526/204 |
| 5,654,434 A | | 8/1997 | Pastor et al. ................ | 546/242 |
| 5,872,252 A | * | 2/1999 | Sutoris et al. .............. | 526/204 |
| 5,914,379 A | | 6/1999 | Sutoris et al. .............. | 526/204 |
| 5,922,244 A | | 7/1999 | Koch et al. ................. | 252/403 |
| 6,140,396 A | * | 10/2000 | Sugioke et al. ............ | 524/718 |
| 6,281,311 B1 | | 8/2001 | Lai et al. .................... | 526/220 |
| 6,288,186 B1 | | 9/2001 | Matyjaszewski et al. ... | 526/220 |

FOREIGN PATENT DOCUMENTS

| | | | |
|---|---|---|---|
| DE | 19648811 | 5/1998 | |
| RU | 478 838 | * 9/1973 | ................. 526/204 |
| WO | 97/36944 | 10/1997 | |

OTHER PUBLICATIONS

Derwent Abstr. 95–515030/51 for JP 08269117 (1996).

\* cited by examiner

*Primary Examiner*—Peter Szekely
(74) *Attorney, Agent, or Firm*—Tyler A. Stevenson

(57) ABSTRACT

The present invention relates to a polymerizable composition, comprising a) at least one ethylenically unsaturated monomer or oligomer, b) a radical source capable of starting polymerization of the ethylenically unsaturated monomer or oligomer and c) at least one compound of formula (I), wherein n is 1 or 2; $R_3$, $R_4$, $R_9$, $R_{10}$ are each independently of one another $C_1$–$C_{18}$alkyl, $C_2$–$C_{18}$alkenyl or $C_2$–$C_{18}$alkinyl; or $R_3$ and $R_4$ and/or $R_9$ and $R_{10}$ form together with the linking carbon atom a $C_3$–$C_{12}$cycloakyl radical; $R_5$, $R_6$, $R_7$, $R_8$ are each independently of one another hydrogen, $C_1$–$C_{18}$alkyl, $C_2$–$C_{18}$alkenyl or $C_2C_{18}$alkinyl; X is —O—, —O—C(O)—, —$NR_2$— or —$NR_2$—C(O)—; $R_2$ is hydrogen, $C_1$–$C_{18}$alkyl or phenyl; if n is 1, $R_1$ is $C_8$–$C_{36}$alkyl, $C_8$–$C_{36}$alkenyl or $C_8$–$C_{36}$alkinyl; if n is 2, $R_1$ is $C_{10}$–$C_{36}$alkylen, $C_{10}$–$C_{36}$alkenylen or $C_{10}$–$C_{36}$alkinylen. Further objects of the present invention are a process for polymerization and the use of compounds of formula (I) for the polymerization of ethylenically unsaturated monomers.

11 Claims, No Drawings

USE OF 2,2,6,6 TETRAALKYLPIPERIDINE-N-OXYL RADICALS HAVING LONG ALKYL CHAINS AS POLYMERIZATION REGULATORS

The present invention relates to a polymerizable composition comprising a) at least one ethylenically unsaturated monomer, b) a free radical source and c) a 2,2,6,6-tetraalkylpiperidine having a long chain alkyl group. Further aspects of the present invention are a process for polymerizing ethylenically unsaturated monomers, and the use of a 2,2,6,6-tetraalkylpiperidine derivative having a long chain alkyl group for controlled polymerization.

The compounds of the present invention provide polymeric resin products having low polydispersity. The polymerization process proceeds with enhanced monomer to polymer conversion efficiency. In particular, this invention relates to stable free radical-mediated polymerization processes which provide homopolymers, random copolymers, block copolymers, multiblock copolymers, graft copolymers and the like, at enhanced rates of polymerization and enhanced monomer to polymer conversions.

Polymers or copolymers prepared by conventional free radical polymerization processes inherently have broad molecular weight distributions or polydispersities which are generally higher than the theoretical limit of 1.5–2.0. In industrial processes values higher than four are not uncommon.

Conventional radical polymerization processes pose various significant problems, such as difficulties in predicting or controlling the molecular weight, the polydispersity and the modality of the polymers produced. These prior art polymerization processes produce polymers having broad polydispersities.

Furthermore, free radical polymerization processes in bulk of the prior art are difficult to control because the polymerization reaction is strongly exothermic and an efficient heat removal in the highly viscous polymer is mostly impossible. The exothermic nature of the prior art free radical polymerization processes often severely restricts the concentration of reactants or the reactor size upon scale-up.

Due to the above mentioned uncontrollable polymerization reactions, gel formation in conventional free radical polymerization processes are also possible and cause broad molecular weight distributions and/or difficulties during filtering, drying and manipulating the product resin.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3-tetraethylisoindoline, 1,1,3,3-tetrapropylisoindoline, 2,2,6,6-tetramethylpiperidine, 2,2,5,5-tetramethyl-pyrrolidine or di-t-butylamine. However, the suggested compounds do not fulfill all requirements.

EP-A-735 052 discloses a general method for preparing thermoplastic polymers of narrow polydispersities by free radical-initiated polymerization, which comprises adding a free radical initiator (free radical source) and a stable free radical agent to the monomer compound.

This method has the disadvantage that uncontrollable recombinations of initiator radicals occur immediately after their formation, thus producing variable ratios between initiator radicals and stable free radicals. Consequently monomer to polymer conversion may become low and/or polydispersity high.

JP 8269117, published 1996 has selected the N-oxyls of bis(2,2,6,6-tetramethyl-4-piperidyl)sebacic acid ester and tetrakis (2,2,6,6-tetramethyl-4-piperidyl)1,2,3,4-butanetetracarboxylate as being particularly useful in controlled polymerization reactions.

Surprisingly it has now been found that 2,2,6,6-tetraalkylpiperidine derivatives having a long chain alkyl or alkylene group in 4 position attached to the piperidine ring are excellent regulators in such systems.

Monomer to polymer conversion is higher as known from prior art polymerizations and polydispersity of the polymers produced is surprisingly low, whereas reaction times are short even at relatively low temperatures, making the polymerization process particularly suitable for industrial applications.

The polymerization processes and resin products of the present invention can be used for a wide range of purposes, for example for pipes, profiles, sheets, cable insulations, sports equipment, garden furniture, films, structural parts, parts of vehicles and machines, and containers of any type, for example bottles, foamed materials, such as insulation panels or packaging material. The polymerization processes are useful for the preparation of block copolymers which are useful as compatibilizing agents or impact modifiers for polymer blends, or dispersing agents for coating systems or for the preparation of narrow molecular weight resins or oligomers for use in coating technologies and thermoplastic films or as toner resins and liquid immersion development ink resins or ink additives used for electrophotographic imaging processes.

The polymers obtainable according to this invention can be brought into the desired shape in known manner. Such processes are, for example grinding, calendering, extruding, injection moulding, blow moulding, sintering and spinning.

The resulting (co)polymers are of high purity, therefore not requiring any further purification.

One object of the present invention is to provide a polymerizable composition, comprising
  a) at least one ethylenically unsaturated monomer or oligomer,
  b) a radical source capable of starting polymerization of the ethylenically unsaturated monomer or oligomer and
  c) at least one compound of formula (I)

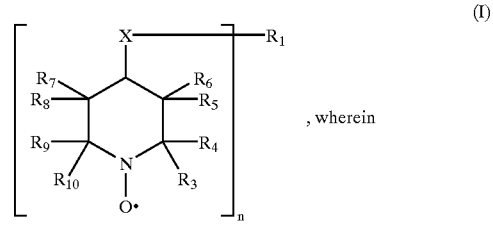

, wherein n is 1 or 2
  $R_3$, $R_4$, $R_9$, $R_{10}$ are each independently of one another $C_1$–$C_{18}$alkyl, $C_2$–$C_{18}$alkenyl or $C_2$–$C_{18}$alkinyl; or
  $R_3$ and $R_4$ and/or $R_9$ and $R_{10}$ form together with the linking carbon atom a $C_3$–$C_{12}$cycloalkyl radical;
  $R_5$, $R_6$, $R_7$, $R_8$ are each independently of one another hydrogen, $C_1$–$C_{18}$alkyl, $C_2$–$C_{18}$alkenyl or $C_2$–$C_{18}$alkinyl;
  X is —O—, —O—C(O)—, —NR$_2$— or —NR$_2$—C(O)—;

$R_2$ is hydrogen, $C_1$–$C_{18}$alkyl or phenyl;
if n is 1,
$R_1$ is $C_8$–$C_{36}$alkyl, $C_8$–$C_{36}$alkenyl or $C_8$–$C_{36}$alkinyl
if n is 2
$R_1$ is $C_{10}$–$C_{36}$alkylen, $C_{10}$–$C_{36}$alkenylen or $C_{10}$–$C_{36}$alkinylen.

The alkyl radicals may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Examples for alkyl containing up to 36 carbon atoms are eicosyl, docosyl, pentacosyl, hexacosyl, heptacosyl or octacosyl.

The alkenyl radicals may be linear or branched. Examples of $C_8$–$C_{36}$alkenyl are octenyl, undecenyl, octadecenyl, eicosenyl, pentacosenyl or octacosenyl.

Examples of $C_8$–$C_{36}$alkinyl are 5-undecinyl, 6-octadecinyl, eicosinyl, pentacosinyl or octacosinyl. The alkinyl radicals may be linear or branched.

Typical alkylen groups are decylen, eicosylen, pentacosylen

Preferably $R_3$, $R_4$, $R_9$, $R_{10}$ are methyl groups and $R_5$, $R_6$, $R_7$, $R_8$ are hydrogen.

Preferably X is —O— or —O—C(O)—, more preferably X is —O—C(O)—.

Preferably n is 1 and $R_1$ is $C_8$–$C_{25}$alkyl, more preferably $C_{11}$–$C_{25}$alkyl and most preferably $C_{15}$–$C_{25}$alkyl.

A particularly preferred group of compounds are those of formula

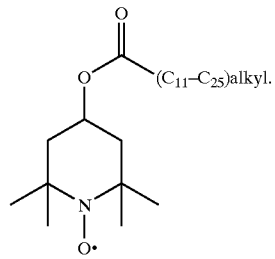

Another preferred group of compounds is, wherein n is 2 and $R_1$ is $C_{12}$–$C_{24}$alkylen.

$R_2$ is preferably hydrogen or $C_1$–$C_4$alkyl.

When the compounds of formula (I) are prepared from commercial grade starting materials the substituent $R_1$ may often be a mixture of alkyl or alkylene chains of different lengths, centered around a main component.

Preferably the ethylenically unsaturated monomer or oligomer is selected from the group consisting of styrene, substituted styrene, conjugated dienes, acrolein, acrylonitril, vinyl acetate, (alkyl)acrylic acidanhydrides, (alkyl)acrylic acid salts, (alkyl)acrylic esters or (alkyl)acrylamides.

More preferably the ethylenically unsaturated monomer is styrene, α-methyl styrene, p-methyl styrene, 1,3-dienes or a compound of formula $CH_2$=$C(R_a)$—(C=Z)—$R_b$, wherein $R_a$ is hydrogen or $C_1$–$C_4$alkyl, $R_b$ is $NH_2$, OMe, glycidyl, unsubstituted $C_1$–$C_{18}$alkoxy or hydroxy-substituted $C_1$–$C_{18}$alkoxy, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino. Z is oxygen or sulfur and Me is an alkali metal cation.

Most preferably the ethylenically unsaturated monomer is styrene, α-methyl styrene, p-methyl styrene, butadiene, isoprene.

Preferably the compound of formula (I) or a mixture thereof is present in an amount of from 0.001 mol-% to 30 mol-%, more preferred in an amount of from 0.002 mol-% to 5 mol-% and most preferred in an amount of from 0.005 mol-% to 2 mol-% based on the monomer or monomer mixture.

The molar ratio between free radical source b) and the nitroxyl compound of formula I is preferably from 20:1–1:2, more preferably from 10:1–1:1.5 and most preferably from 2:1–1:1.4. Particularly preferred is a molar ratio of 1:1.3.

When monomer mixtures are used mol % is based on an average molecular weight of the mixture.

A further object of the present invention is a process for preparing an oligomer, a cooligomer, a polymer or a copolymer (block or random) by free radical polymerization of at least one ethylenically unsaturated monomer or oligomer, which comprises heating the monomer or monomers/oligomers in the presence of a free radical source and a compound of formula (I) and polymerizing the ethylenically unsaturated monomer or oligomer.

The definitions and preferences given for the composition apply also for the process for preparing an oligomer, a cooligomer, a polymer or a copolymer.

The polymerization reaction temperature is kept relatively constant throughout the heating step by providing an adjustable external heat source and the temperature is from about 60° C. to 220° C. preferably between 100° C. and 180° C. and optimally between 120° C. and 140° C. Reactions performed above 160° C. tend to result in a broadening of the poly-dispersity.

A reaction volume may be selected for any size that enables simple adding, mixing, reacting and isolating the product on an economic or convenient scale.

Preferably the free radicals from the free radical source are generated thermally. Therefore the radical formation depends on the decomposition temperature of the radical generator. Peroxides can be used within a temperature range from 60° C. to 180° C. more preferably from 110° C. to 180° C. Azo compounds have lower decomposition temperatures and can therefore be used within 40° C. to 140° C. more preferably from 60° C. to 120° C.

Yet another object of the present invention is the use of a compound of formula (I) together with a free radical source for the controlled polymerization of ethylenically unsaturated monomers or oligomers.

The production of C-centered radicals is described, inter alia, in Houben Weyl, Methoden der Organischen Chemie, Vol. E 19a, pages 60–147. These methods can be applied in general analogy.

Examples of free radical sources suitable in the present invention are derived from peroxides, hydroperoxides or azo compounds.

Examples for free radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide, methylethylketonperoxide, 2,5-dimethyl-2, 5-di-tert.-butylperoxyhexane, 2,5-dimethyl-2,5-di-tert.-butylperoxyhexyne, di-tert.-butyl-peroxide, di-tert.-butylperoxyisopropylbenzene, tert.-butyl-3-isopropenylcumeneperoxide, di-(1-hydroxycyclohexyl) peroxide, dibenzylperoxid), diisopropylperoxydicarbonate, bis-(4-tert.-butylcyclohexyl)peroxidicarbonate, tert.-butylperoxybenzoate or hydrogenperoxide.

Preferred radical sources are 2,2'-azobisisobutyronitrie, 1,1'-azobis(1-cyclohexanecarbonitrile), 2,2'-azobisisobutylacetate. 5,5'-azobis-(5-ethyl-1,3-dioxane), dibenzoylperoxide, dicumylperoxide, di-tert.butylperoxide, di-laurylperoxide, cumyhydroperoxide and hydrogenperoxide and mixtures thereof.

Preferably the radical source is present in an amount of from 0.001 to 25 mol %, more preferably from 0.002 to 10 mol % and most preferred from 0.005 to 2 mol %, based on the monomer used.

The compounds of formula (I) and their precursors are known and their preparation is described for example in U.S. Pat. Nos. 5,654,434 and 5,204,473.

Suitable monomers are those mentioned above. The polymers formed by the present process may be isolated prior to a next reaction step or may be used without isolation, and a second monomer is added to the reaction mixture of the first step, which leads to block copolymers.

Block copolymers are, for example, block copolymers of polystyrene and poly-1,3-dienes (e.g. Poly(styrene-co-butadiene) or Poly(styrene-co-butadiene-co-styrene)) or polystyrene and polyacrylates (e.g. Poly(styrene-co-acrylate) or Poly(styrene-co-acrylate-co-styrene). They are useful as polymers in applications for pipes, profiles, sheets, cable insulations, sports equipment, garden furniture, films, structural parts, parts of vehicles and machines, and containers of any type, for example bottles, foamed materials, such as insulation panels or packaging material. They can also be used as impact modifiers, adhesives, compatibilizers for polymer blends or as polymer toughening agents. Block copolymers of styrene, (meth)acrylates and/or acrylonitrile are useful plastics, elastomers and adhesives.

Furthermore, block copolymers of this invention, wherein the blocks alternate between polar monomers and non-polar monomers, are useful in many applications as amphiphilic surfactants or dispersants for preparing highly uniform polymer blends.

The (co)polymers of the present invention may have a number average molecular weight from 1000 to 500000 g/mol, preferably from 2000 to 250000 g/mol and, more preferably, from 5000 to 150000 g/mol. The number average molecular weight may be determined by size exclusion chromatography (SEC), gel permeation chromatography (GPC), matrix assisted laser desorption/ionization mass spectrometry (MALDI-MS) or, if the initiator carries a group which can be easily distinguished from the monomer (s), by NMR spectroscopy or other conventional methods.

The (co)polymers of the present invention typically have a low polydispersity. Preferably the polydispersity is from 1.1 to 2.2, more preferably from 1.1 to 1.9 and most preferably from 1.2 to 1.8.

The present invention also encompasses in the synthesis novel block, multi-block, star, gradient, random, hyper-branched and dendritic copolymers, as well as graft or copolymers.

The polymers prepared by the present invention are useful for following applications:

pipes, profiles, sheets, cable insulations, sports equipment, garden furniture, films, structural parts, parts of vehicles and machines, and containers of any type, for example bottles, foamed materials, such as insulation panels or packaging material, impact modifiers, compatibilizers for polymer blends, polymer toughening agents, adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Because the present polymerizaton is a "living" polymerization, it can be started and stopped practically at will. Furthermore, the polymer product retains the functional alkoxyamine group allowing a continuation of the polymerization in a living matter. Thus, in one embodiment of this invention, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers. Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a styrene or 1,3-diene block is prepared first, then a polyacrylonitrile or a poly(meth)acrylate block is attached thereto, and so on. Furthermore, there is no linking group required for joining the different blocks of the present block copolymer. One can simply add successive monomers to form successive blocks. A plurality of specifically designed polymers and copolymers are accessible by the present invention, such as star and graft (co)polymers as described, inter alia, by C. J. Hawker in Angew. Chemie, 1995, 107, pages 1623–1627, dendrimers as described by K. Matyaszewski et al. in Macromolecules 1996, 29, pages 4167–4171, graft (co)polymers as described by C. J. Hawker et al. in Macromol. Chem. Phys. 1997, 198, 155–166, random copolymers as described by C. J. Hawker in Macromolecules 1996, 29, 2686–2688, or diblock and triblock copolymers as described by N. A. Listigovers in Macromolecules 1996, 29, 8992–8993.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

Preferred processes use as little solvents as possible. In the reaction mixture it is preferred to use more than 30% by weight of monomer, radical source and regulator, particularly preferably more than 50% and most preferably more than 80%.

Most preferred processes are bulk polymerizations without any solvent.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

THE FOLLOWING EXAMPLES ILLUSTRATE THE INVENTION

Preparation of Compound 101

To a solution of 2,2,6,6-tetramethylpiperidin-4-hydroxy-1-N-oxyl (43,1 g) in toluene (60 g) tetrabutylammonium bromide (2,7 g) is added, followed by a solution of sodium hydroxyde (33 g) in water (33 g). The mixture is heated to 55° C. To the well stirred mixture 1-octyl bromide (96,6 g) is added over a period of one hour. The reaction mixture is stirred over night and then cooled down to room temperature. The mixture is washed with water and the organic phase dried over sodium sulfate. After evaporation of the solvent a red liquid, which is further purified by column chromatography (silica gel; petrol ether/acetic ester=9/1) is obtained. The red oil corresponds to the formula

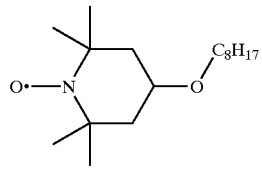

(101)

Preparation of Compound 107

To an agitated ice cold solution of 2,2,6,6-tetramethylpiperidin-4-hydroxy-1-N-oxyl (98,2 g) and triethylamine (69,3 g) in toluene (220 g) a solution of stearic acid chloride (205,4 g) in toluene (220 g) is added within one hour. After completed addition the temperature is raised to room temperature and agitation continued for another 18 h. The suspension is extracted with water several times. The organic phase is dried over magnesium sulfate, filtered and evaporated to dryness. The residue is dissolved in petrolether/acetic acid ester (9/1) and filtered over a silicagel column. After evaporation of the solvents, the residue is dried under high vacuum at 60° C. Compound 107 is obtained as a red brownish solid with a melting point of 34–35° C.:

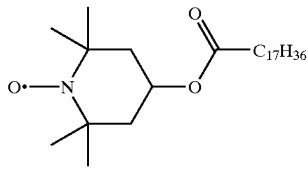

(107)

Preparation of Compound 108

Acylation

To an agitated solution of 2,2,6,6-tetramethyl-4-aminopiperidine (71,2 g) in toluene (430 g) triethylamine (60,7 g) and 4-dimethylamino-pyridine (0,6 g) are added at room temperature. Within 30 min a solution of laurinic acid chloride (120,3 g) in toluene (87 g) is slowly added and the reaction temperature maintained below 40° C. After complete addition the temperature is raised to 100° C. and agitation continued for 18 h. After cooling to room temperature the suspension is filtered and the residue taken up with methylenchloride (660 g) and washed several times with a saturated aqueous solution of sodium bicarbonate. The organic solution is dried over magnesium sulfate and evaporated to dryness. A white solid of formula

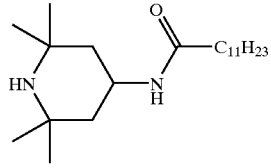

is obtained melting at >250° C.

Oxidation

To an agitated ice cold mixture of the above amide (101,6 g) in tetrahydrofurane (250 g) a solution of m-chloroperbenzoic acid (70%, 125,8 g) in tetrahydrofurane (460 g) is added within one hour. After complete addition agitation is continued for 17 h at room temperature. The red solution is diluted with hexane (600 g) and the mixture extracted with several portions of a 1M aqueous solution of sodium bicarbonate and afterwards with a saturated solution of sodium chloride. The organic phase is dried over sodium sulfate and evaporated to dryness. The residue is further purified by column chromatography (silica gel; hexane/acetic acid ethylester=1:1). Compound 108 is obtained as a red solid with a melting point of 48–50° C.

Compounds prepared are listed in Table 1

TABLE 1

| Compound No. | Structure | Remarks |
|---|---|---|
| 101 | ![structure with C8H17] | red oil |
| 102 | ![structure with C18H37] | prepared in analogy to compound 101; mp. 41–44° C. |

TABLE 1-continued

| Compound No. | Structure | Remarks |
|---|---|---|
| 103 | 4-(octanoyloxy)-TEMPO (R = $C_8H_{17}$) | prepared in analogy to compound 107; red oil |
| 104 | 4-(lauroyloxy)-TEMPO (R = $C_{11}H_{23}$) | prepared in analogy to compound 107; red oil |
| 105 | 4-acyloxy-TEMPO (R = $C_{12}H_{26}$) | prepared in analogy to compound 107; mp. 35–36° C. |
| 106 | 4-acyloxy-TEMPO (R = $C_{13}H_{27}$) | prepared in analogy to compound 107; red oil |
| 107 | 4-acyloxy-TEMPO (R = $C_{17}H_{36}$) | mp. 34–35° C. |
| 108 | 4-acylamino-TEMPO (R = $C_{11}H_{23}$, N–H) | mp. 48–50° C. |
| 109 | 4-(N-butyl-acylamino)-TEMPO (R = $C_{11}H_{23}$) | prepared in analogy to compound 108; mp. 41–43° C. |
| 110 | 4-acylamino-TEMPO (R = $C_{12}H_{26}$, N–H) | prepared in analogy to compound 108, mp. 49–52° C. |

TABLE 1-continued

| Compound No. | Structure | Remarks |
|---|---|---|
| 111 | 2,2,6,6-tetramethyl-1-oxyl-piperidin-4-yl with NH-C(=O)-C$_{18}$H$_{31}$ | prepared in analogy to compound 107; mp. 33.5° C. |
| 112 | 2,2,6,6-tetramethyl-1-oxyl-piperidin-4-yl with NH-C(=O)-C$_{17}$H$_{26}$ | prepared in analogy to compound 108; mp. 54° C. |
| 113 | 2,2,6,6-tetramethyl-1-oxyl-piperidin-4-yl with N(butyl)-C(=O)-C$_8$H$_{17}$ | prepared in analogy to compound 108; red oil |
| 114 | 2,2,6,6-tetramethyl-1-oxyl-piperidin-4-yl with O-C(=O)-C$_{21}$H$_{43}$ | prepared in analogy to compound 107; mp. 54–55° C. |

In evacuated Schlenk reactor, purged with argon, the amount of initiator and stable nitroxyl radical given in Table 2 are added to 50 ml styrene under argon atmosphere. Dissolved oxygen is removed in two freeze thaw cycles (liquid nitrogen). The reaction mixture is stirred and heated under argon atmosphere to 130° C. for 6 hours. Remaining monomer is removed at 60° C. under vacuum. The residue is dried in a first step under vacuum and in a second step under normal pressure at 70° C. until constant weight is achieved.

Molecular weights and molecular weight distributions are determined by gel permeation chromatography (GPC).

The results are shown in Table 2

TABLE 2

| No. | NO-radical | Conc. % on styrene | BPO % on styrene | Conversion (%) | $M_n$ | $M_w$ | $M_w/M_n$ |
|---|---|---|---|---|---|---|---|
| V1 | TEMPO | 1 mol % | 0.77 mol % | 28 | 3700 | 4800 | 1.29 |
| V2 | HO-TEMPO | 1 mol % | 0.77 mol % | 17 | 2100 | 2600 | 1.26 |
| V3 | Benzoyl-TEMPO | 1 mol % | 0.77 mol % | 39 | 4800 | 6000 | 1.25 |
| Ex. 1 | Compound 107 | 1 mol % | 0.77 mol % | 63 | 9000 | 11200 | 1.25 |
| Ex. 2 | Compound 107 | 0.1 mol % | 0.077 mol % | 75 | 54000 | 77300 | 1.43 |
| Ex. 3 | Compound 107 | 0.01 mol % | 0.0077 mol % | 72 | 148300 | 272100 | 1.83 |
| Ex. 4 | Compound 107 | 0.05 mol % | 0.0385 mol % | 73 | 78300 | 114300 | 1.46 |
| Ex. 5 | Compound 107 | 0.5 mol % | 0.385 mol % | 61 | 16300 | 20500 | 1.26 |
| Ex. 6 | Compound 104 | 0.01 mol % | 0.0077 mol % | 72 | 153000 | 254000 | 1.65 |
| Ex. 7 | Compound 104 | 0.05 mol % | 0.0385 mol % | 71 | 77200 | 110100 | 1.43 |
| Ex. 8 | Compound 104 | 0.5 mol % | 0.385 mol % | 40 | 10200 | 12100 | 1.20 |
| Ex. 9 | Compound 104 | 1 mol % | 0.77 mol % | 49 | 7900 | 9200 | 1.16 |
| Ex. 10 | Compound 103 | 0.1 mol % | 0.077 mol % | 68 | 51900 | 76300 | 1.47 |
| Ex. 11 | Compound 103 | 1 mol % | 0.77 mol % | 66 | 10200 | 13100 | 1.28 |

TEMPO = 2,2,6,6-tetramethylpiperidine-1-oxyl;
HO-TEMPO = 2,2,6,6-tetramethylpiperidine-4-hydroxy-1-oxyl;
Benzoyl-TEMPO = 2,2,6,6-Tetramethylpiperidine-4-benzoyl-1-oxyl;
BPO = bis-benzoylperoxide
V1–V3 comparative experiments.

What is claimed is:

1. A process for preparing an oligomer, a cooligomer, a polymer or a copolymer (block or random) by free radical polymerization of at least one ethylenically unsaturated monomer or oligomer, which process consists of heating and polymerizing the monomer, monomers, oligomer or oligomers in the presence of a free radical source and at least one compound of formula (I)

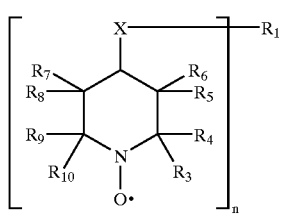

where
n is 1 or 2;
$R_3$, $R_4$, $R_9$, $R_{10}$ are each independently of one another $C_1$–$C_{18}$alkyl, $C_2$–$C_{18}$alkenyl or $C_2$–$C_{18}$alkinyl; or $R_3$ and $R_4$ and/or $R_9$ and $R_{10}$ form together with the linking carbon atom a $C_3$–$C_{12}$cycloalkyl radical;
$R_5$, $R_6$, $R_7$, $R_8$ are each independently of one another hydrogen, $C_1$–$C_{18}$alkyl, $C_2$–$C_{18}$alkenyl or $C_2$–$C_{18}$alkinyl;
X is —O—, —O—C(O)—, —NR$_2$— or —NR$_2$—C(O)—;
$R_2$ is hydrogen, $C_1$–$C_{18}$alkyl or phenyl;
if n is 1,
$R_1$ is $C_8$–$C_{36}$alkyl, $C_8$–$C_{36}$alkenyl or $C_8$–$C_{36}$alkinyl; and
if n is 2,
$R_1$ is $C_{10}$–$C_{36}$alkylene, $C_{10}$–$C_{36}$alkenylene or $C_{10}$–$C_{36}$alkinylene.

2. A process according to claim 1, where in the compound of formula (I), $R_3$, $R_4$, $R_9$ and $R_{10}$ are each methyl and $R_5$, $R_6$, $R_7$ and $R_8$ are each hydrogen.

3. A process according to claim 1 where in the compound of formula (I), X is O or —O—C(O)—.

4. A process according to claim 1 where in the compound of formula (I), n is 1 and $R_1$ is $C_8$–$C_{25}$alkyl.

5. A process according to claim 1 where in the compound of formula (I), n is 2 and $R_1$ is $C_{12}$–$C_{24}$alkylene.

6. A process according to claim 1, where the ethylenically unsaturated monomers or oligomers are selected from the group consisting of styrene, α-methyl styrene, p-methyl styrene, conjugated dienes, acrolein, acrylonitrile, vinyl acetate, (alkyl)acrylic acid anhydrides, (alkyl)acrylic acid salts, (alkyl)acrylic esters and (alkyl)acrylamides.

7. A process according to claim 6 wherein the ethylenically unsaturated monomers are selected from the group consisting of styrene, α-methyl styrene, p-methyl styrene, 1,3-dienes and compounds of formula $CH_2$=$C(R_a)$—(C=Z)—$R_b$, where $R_a$ is hydrogen or $C_1$–$C_4$alkyl, $R_b$ is $NH_2$, OMe, glycidyl, unsubstituted $C_1$–$C_{18}$alkoxy or hydroxy-substituted $C_1$–$C_{18}$alkoxy, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino;

Z is oxygen or sulfur and

Me is an alkali metal cation.

8. A process according to claim 6, where the ethylenically unsaturated monomers are styrene, α-methyl styrene, p-methyl styrene, butadiene or isoprene.

9. A process according to claim 1, wherein the compound of formula (I) or a mixture thereof is present in an amount of from 0.001 mol-% to 30 mol-%, based on the monomer or monomer mixture.

10. A process according to claim 1, where the free radicals from the free radical source are generated at a temperature from 60° C. to 220° C.

11. A process according to claim 10, wherein the free radicals from the free radical source are generated at a temperature from 60° C. to 180° C.

* * * * *